Aug. 31, 1943.     D. A. SCHAITBERGER     2,328,362
POWER DRIVE MECHANISM
Filed May 18, 1942     2 Sheets-Sheet 2

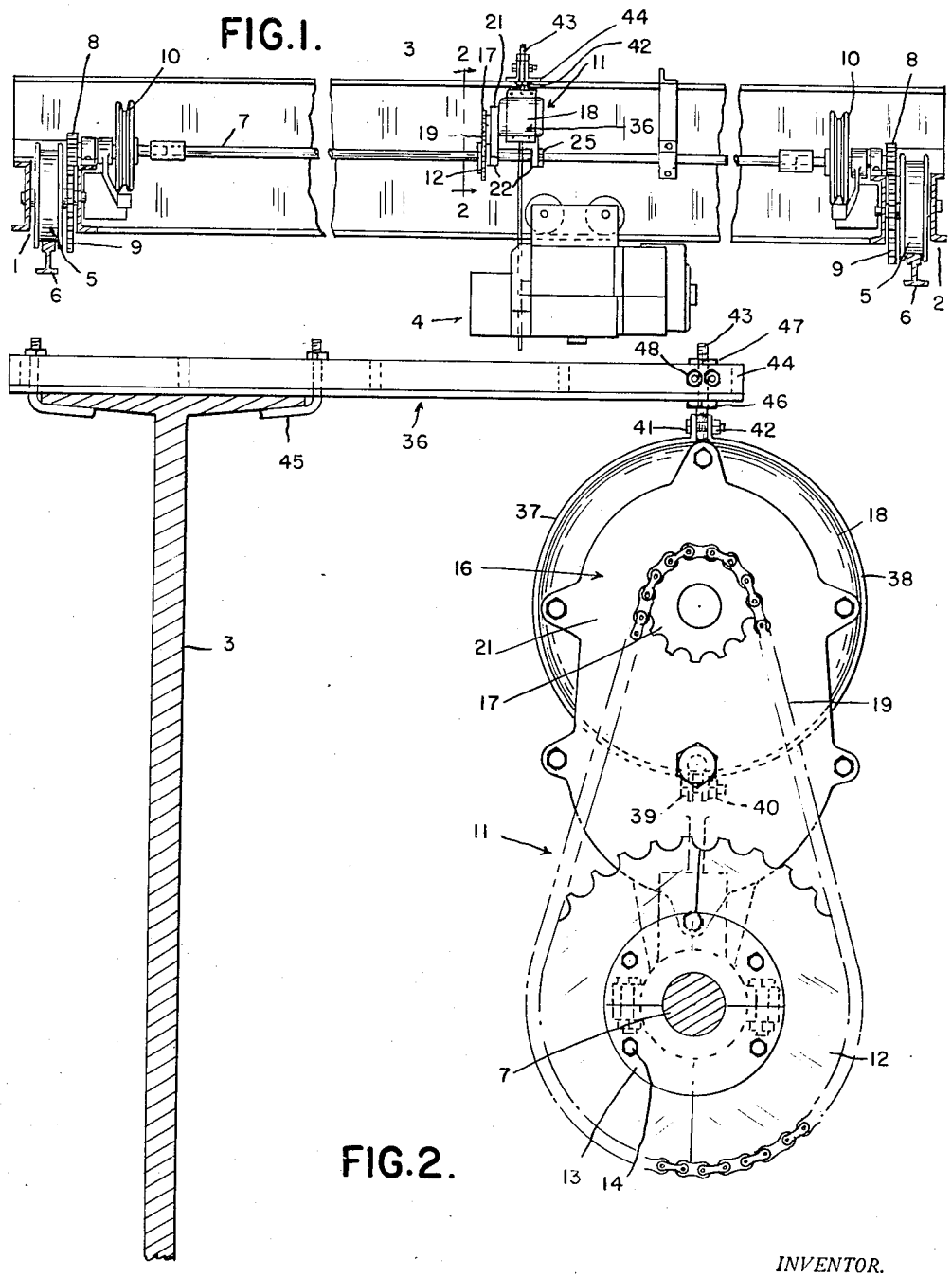

INVENTOR.
DANIEL A. SCHAITBERGER
BY

ATTORNEYS

Patented Aug. 31, 1943

2,328,362

UNITED STATES PATENT OFFICE 2,328,362

POWER DRIVE MECHANISM

Daniel A. Schaitberger, Detroit, Mich., assignor to Northern Engineering Works, Detroit, Mich., a corporation of Michigan Application May 18, 1942, Serial No. 443,502

4 Claims. (Cl. 212—21)

The invention relates to power drive mechanisms and refers more particularly to mechanisms attachable to load carrying devices of the hand-propelled type for converting the devices to the power propelled type.

The invention has for an object to provide a power drive mechanism which is attachable to a hand-propelled load carrying device without drilling, cutting, or otherwise changing the device to adapt the same for the power drive mechanism.

The invention has for another object to provide a power drive mechanism readily attachable to and adapted to drive the propeller shaft of the hand propelling mechanism.

The invention has for a further object to so construct the power drive mechanism that its driving unit is angularly adjustable about the propeller shaft of the hand propelling mechanism to take care of various conditions, including providing clearances for objects on the device or along its path of travel.

With these and other objects in view, the invention resides in the novel features of construction and combinations and arrangements of parts as more fully hereinafter set forth.

In the drawings:

Figure 1 is a front elevation of a power drive mechanism applied to a hand-propelled load carrying device;

Figure 2 is an enlarged cross section on the line 2—2 of Figure 1;

Figure 3:
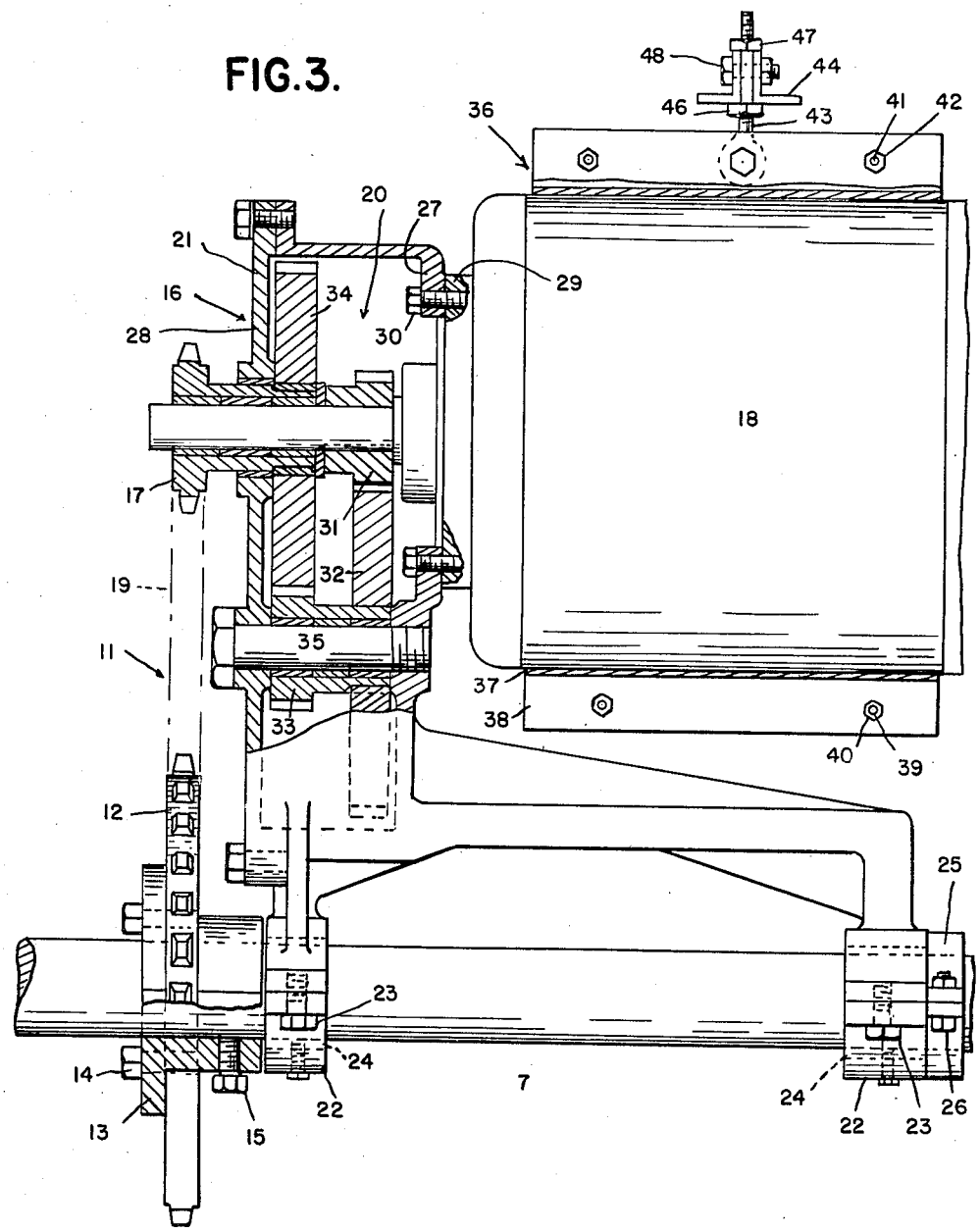
Figure 3 is an enlarged front elevation, partly in section, of the power drive mechanism.

The power drive mechanism embodying the invention is applicable to hand-propelled overhead load carrying devices, such as hand-propelled cranes, hoists, trolleys, and the like, and, as illustrated in the present instance, is attached to a hand-propelled single girder travelling crane.

The crane comprises the end trucks 1 and 2, the single girder 3 in the nature of an I-beam extending between and supported on the end trucks and the electric hoist 4 supported on and adapted to travel along the lower flanges of the girder. The end trucks have the wheels 5 engaging the run-way rails 6 and supporting the crane, corresponding wheels of the end trucks being hand-propelled traction wheels for moving the crane along the run-way rails. The hand-propelled mechanism comprises the propeller shaft and, more particularly, the squaring shaft 7 journaled in suitable bearings and having fixedly secured to its ends the pinions 8 which mesh with the gears 9 fixedly secured to the traction wheels coaxially therewith. The propeller shaft is adapted to be rotated by the grooved wheel 10 which is adapted to be rotated by an endless chain extending over the grooved wheel and depending to a position above the floor or ground where it can be readily manually operated by a person on the floor or ground. The construction of hand-propelled single girder travelling crane as thus far described is a standard construction made by a well-known manufacturing concern.

For the purpose of converting the crane to the power-propelled type to facilitate its travel and to eliminate the hand-operated chain, I have provided a power drive mechanism which is readily attached to the crane without necessitating drilling, cutting, rebuilding, or otherwise changing the crane. In detail, the power drive mechanism comprises the driven member 11 which is formed of the transversely split sprocket 12 and the transversely split hub 13 attachable to the propeller or squaring shaft 7. The parting line between the two sections of the sprocket 12 is preferably arranged at right angles to the parting line between the two sections of the hub 13 and the sections of the sprocket are mounted on the sections of the hub and detachably secured to the radial flanges of the hub by the bolts 14. The hub is suitably secured to the propeller or squaring shaft by the set screw 15. The power drive mechanism also comprises the unit 16 comprising the driving member 17 formed of a sprocket operatively connected to the driven member or sprocket 12 and also to the electric motor 18. The sprocket chain 19 extends over the sprockets 12 and 17 for driving the former from the latter. The reduction gearing 20 between the sprocket 17 and the electric motor 18 is adapted to drive the former from the latter. 21 is a support for the sprocket 17, electric motor 18 and reduction gearing 20, also serving as a housing for the reduction gearing. The support is readily attachable to the propeller or squaring shaft 7 and, as shown, is formed with the hubs 22 each of which is transversely split into sections encircling the propeller or squaring shaft and detachably clamped to each other by the bolts 23. Sectional bearings 24 between the hubs and the propeller or squaring shaft facilitate rotation of the latter relative to the former. 25 is a sectional set collar fixedly secured to the propeller or squaring shaft 7 by the bolts 26 detachably securing the collar sections to each other. The set collar cooperates with the hub 13 to position the support 21 axially relative to the propeller or squaring shaft. The support has a housing chamber receiving the reduction gearing 20 and formed of the end wall 27 and the removable end plate 28, the wall being constructed for mounting the electric motor 18 thereon through the annular flange 29 of the electric motor and the bolts 30. The reduction gearing comprises the pinion 31 secured to the shaft of the electric motor, the gear 32 meshing with the pinion 31 and driving the pinion 33 which meshes with the gear 34 for driving the sprocket 17. The pinion 33 is journaled upon the pin 35 extending through the wall 27 and end plate 28 and the gear 32 is preferably mounted on and keyed or splined to the pinion 33. The sprocket 17 is preferably journaled upon the shaft of the electric motor beyond the pinion 31 and the gear 34 is mounted on and preferably keyed or splined to the sprocket 17.

To hold the driving unit from rotation about the propeller or squaring shaft, I have provided the clamp 36 which is adjustably carried by the girder 3. The clamp, as shown, comprises the generally semi-cylindrical band sections 37 and 38 encircling the electric motor 18 and detachably secured together at corresponding ends by the bolts 39 and nuts 40 and at the other corresponding ends by the bolts 41 and nuts 42. 43 is an eye-bolt pivoted to corresponding ends of the band sections and extending between the angle irons 44 which are detachably clamped to the girder by the hook-bolts 45. 46 and 47 are nuts threaded on the eye-bolt and abutting the tops and bottoms of the angle irons for adjustably holding the eye-bolt at the desired height and 48 are bolts extending through the angle irons to hold the eye-bolt from swinging.

With the above construction, the power drive mechanism is readily attachable to the crane without drilling, cutting, rebuilding, or otherwise changing the crane. The support for the driving sprocket, electric motor and reduction gearing therebetween serves to position these parts so that they may be angularly adjusted about the propeller or squaring shaft and the distance between the axes of the driving and driven sprockets maintained constant to provide for the use of a constant length sprocket chain. As a result, the driving unit may be angularly adjusted about the propeller or squaring shaft to take care of various conditions, including providing clearances for objects on the crane or along its path of travel.

What I claim as my invention is:

1. Power drive mechanism for attachment to a hand-propelled overhead load carrying device comprising a rotatable driven member attachably mounted on the propeller shaft of the hand propelling mechanism, an electric motor, a rotatable driving member operatively connected to said driven member and said motor, a support for said motor and said driving member attachable to and positioned by the propeller shaft to position the axis of said driving member in predetermined relation to the axis of said driven member, and means attachably secured to the load carrying device for holding said support from rotation about the propeller shaft.

2. Power drive mechanism for attachment to a hand-propelled travelling crane comprising a driven member attachably secured to the squaring shaft of the hand propelling mechanism, a motor, a driving member operatively connected to said driven member and said motor, means attachably secured to the squaring shaft for predeterminedly positioning the axis of said driving member relative to the axis of said driven member, and means on the crane for holding said motor and said driving member from rotation about the squaring shaft.

3. Power drive mechanism for attachment to a hand-propelled single girder travelling crane comprising a sprocket attachably mounted on the squaring shaft of the hand propelling mechanism, a unit comprising an electric motor, a sprocket operatively connected to said first mentioned sprocket, reduction gearing for driving said second mentioned sprocket from said motor, and a support for said motor, said second mentioned sprocket and said reduction gearing attachably secured to the squaring shaft for predeterminedly positioning the axis of said second mentioned sprocket relative to the axis of said first mentioned sprocket, and means on the girder of the crane for holding said unit from rotation about the squaring shaft.

4. Power drive mechanism for attachment to a hand-propelled single girder travelling crane comprising a split sprocket attachably mounted on the squaring shaft of the hand propelling mechanism, a second sprocket operatively connected to said first mentioned sprocket, an electric motor, reduction gearing for driving said second sprocket from said electric motor, a support for said second sprocket, reduction gearing and motor also forming a housing for said reduction gearing, said support having split hubs attachably mounted on the squaring shaft, a band attachable to said motor, and an adjustable member carried by the girder of the crane and connected to said band for adjustably positioning said support about the squaring shaft and relative to the girder.

DANIEL A. SCHAITBERGER.